Oct. 29, 1963    H. SCHOR ETAL    3,108,295
FOLDING BOAT
Filed Oct. 6, 1958    5 Sheets-Sheet 1
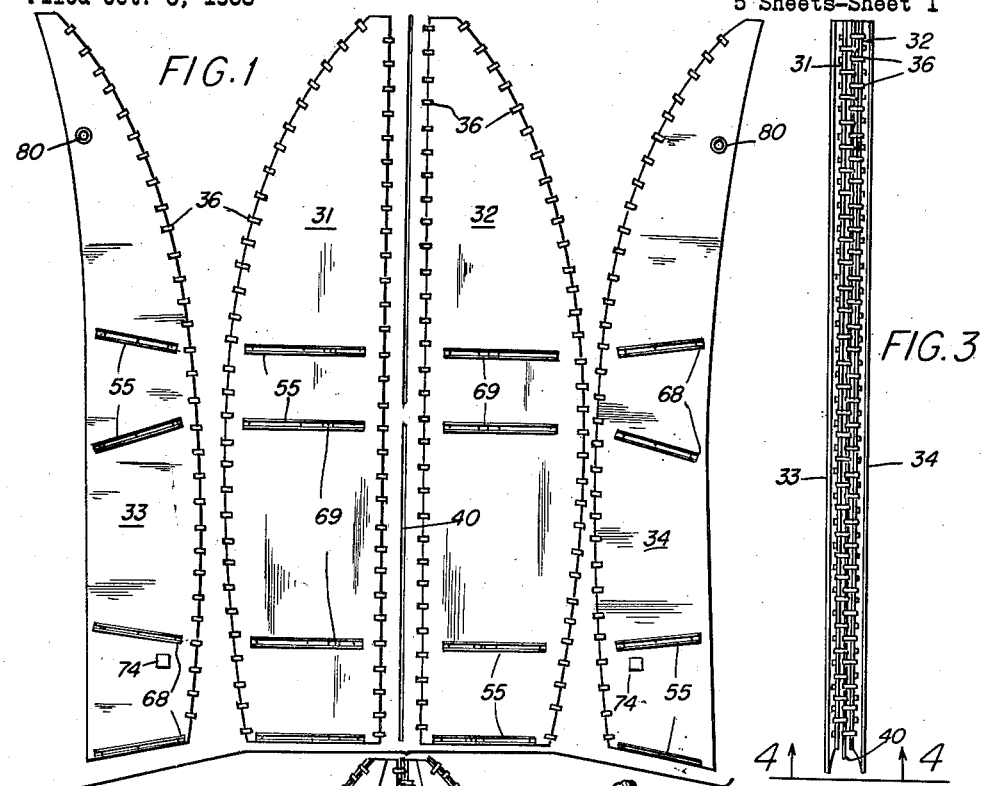
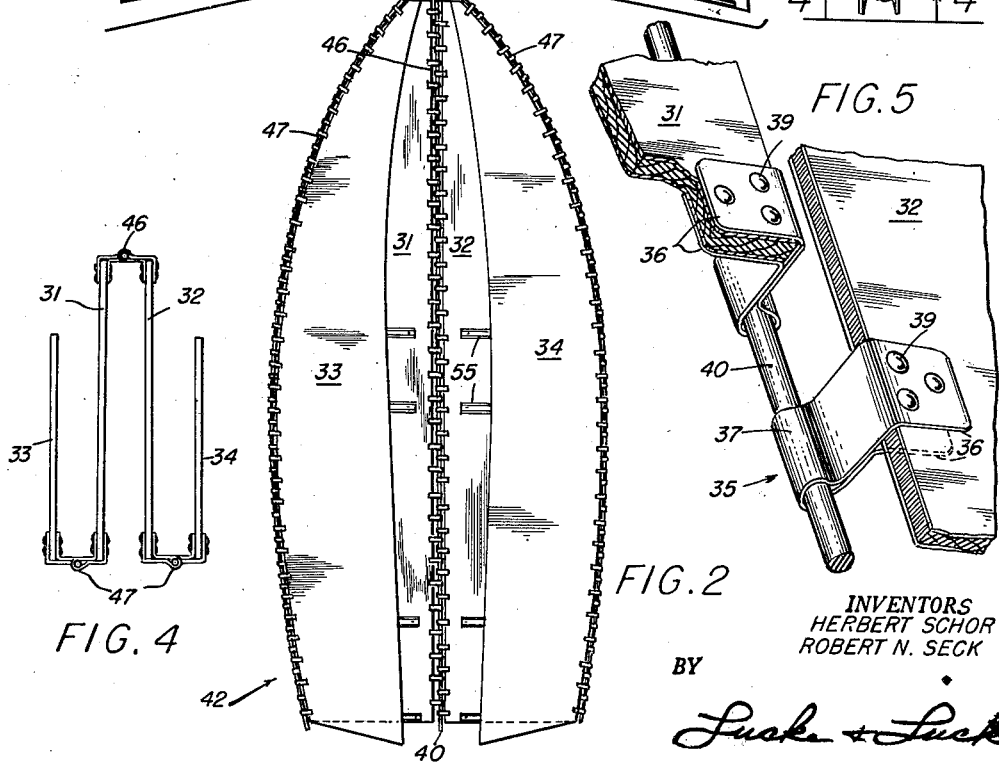
INVENTORS
HERBERT SCHOR
ROBERT N. SECK
BY
*Luske + Luck*

Oct. 29, 1963
H. SCHOR ETAL
3,108,295
FOLDING BOAT
Filed Oct. 6, 1958
5 Sheets-Sheet 2
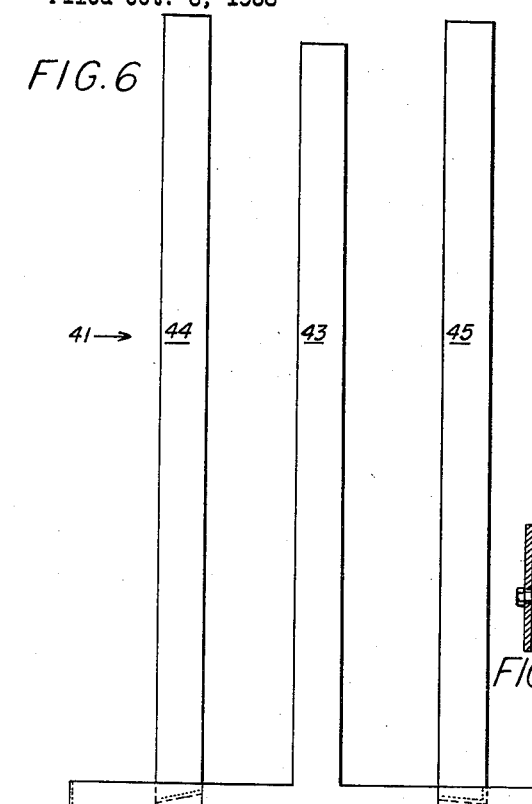
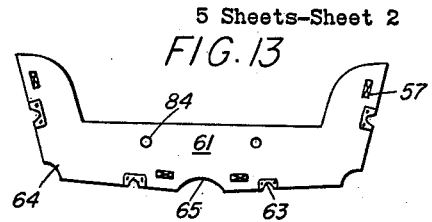
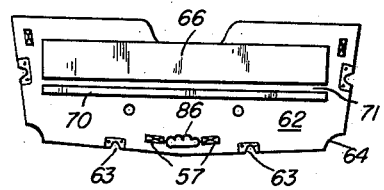
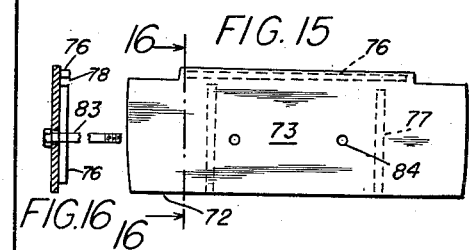
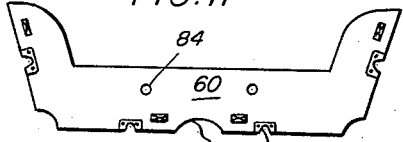
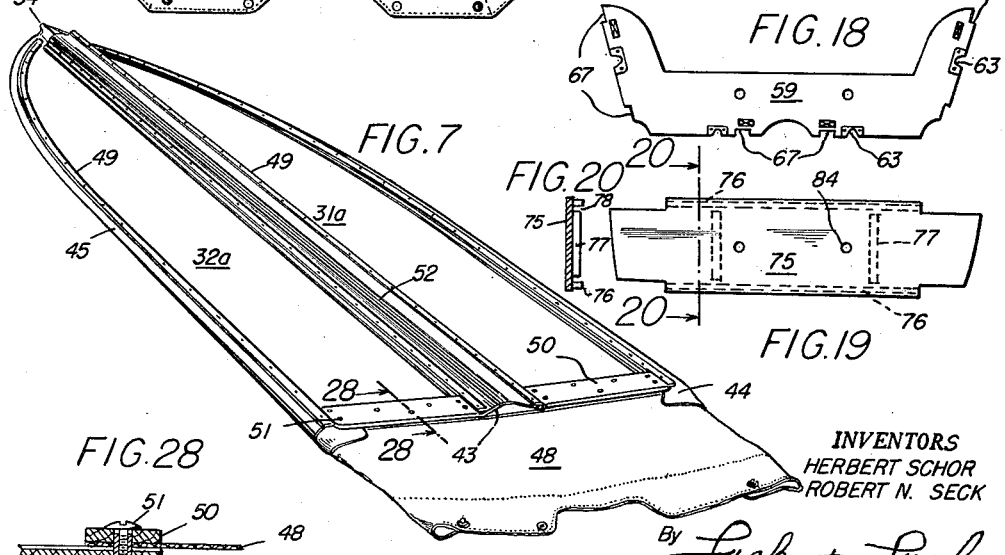
INVENTORS
HERBERT SCHOR
ROBERT N. SECK
By Lucke + Lucke

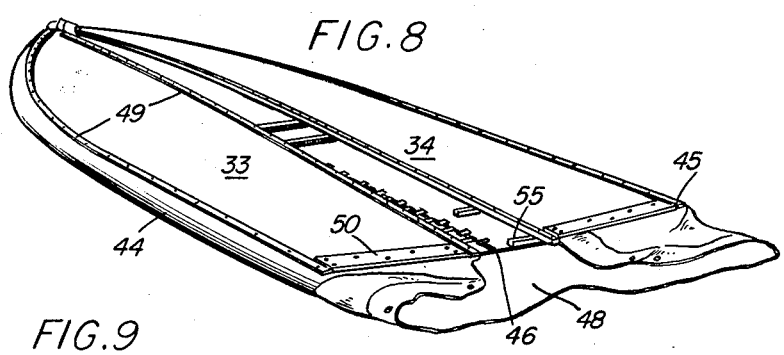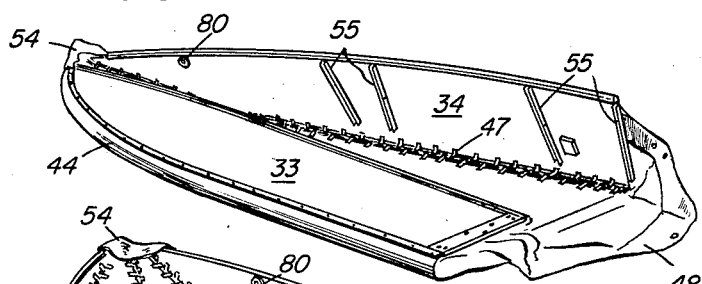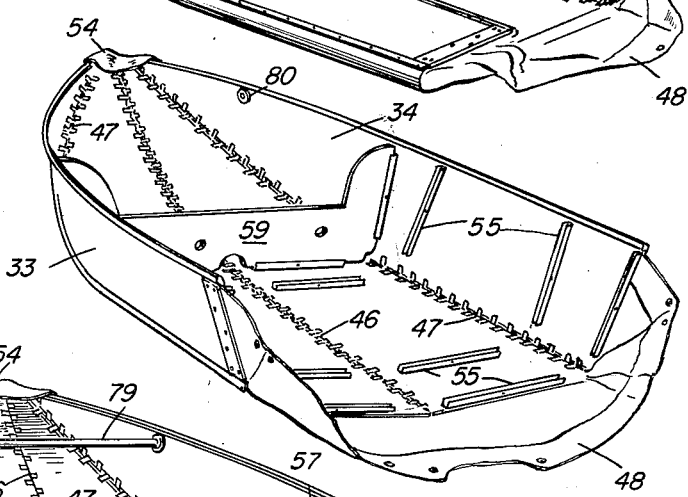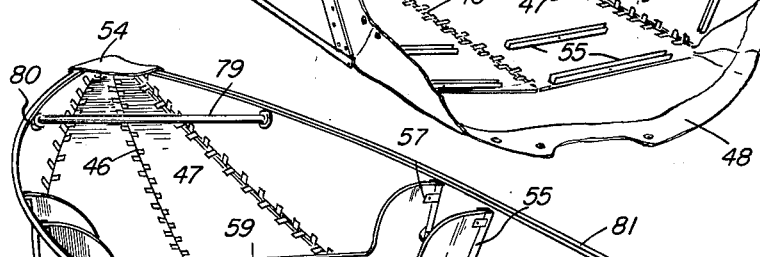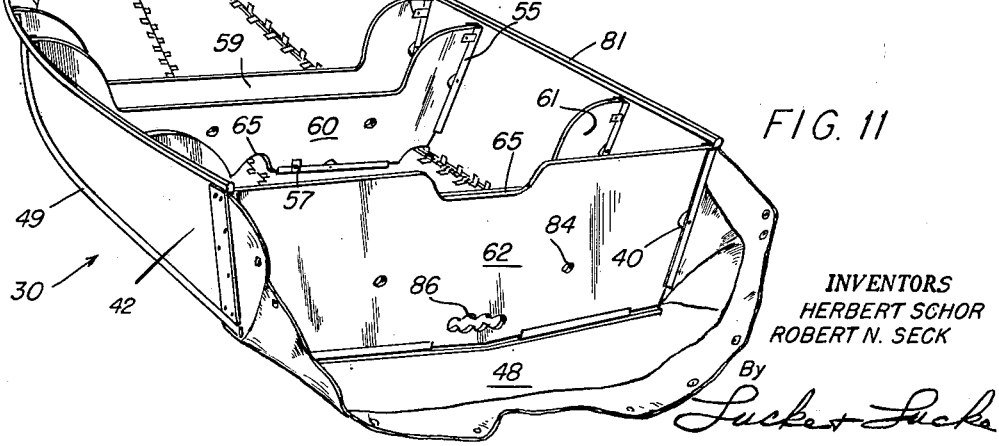

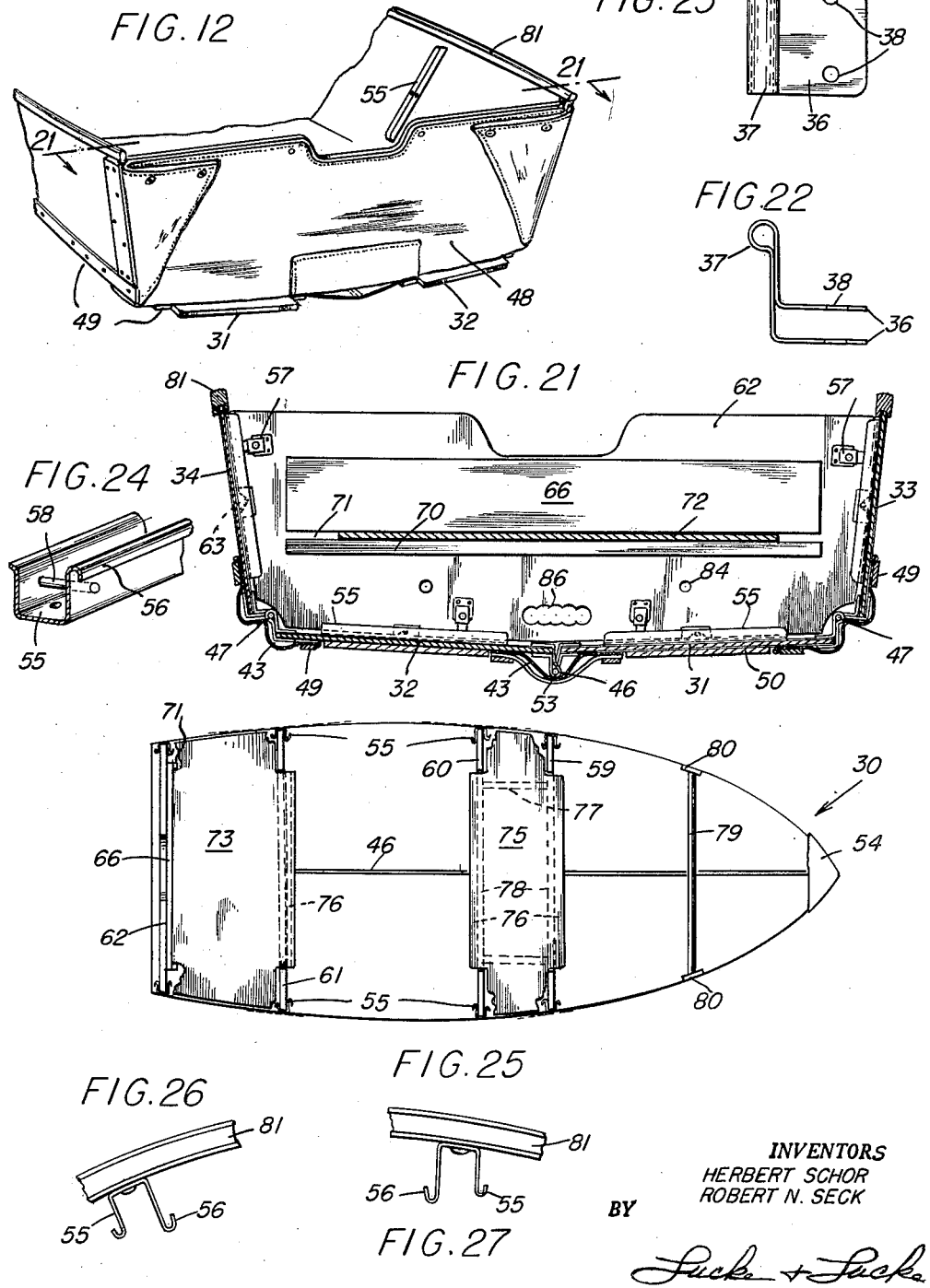

Oct. 29, 1963    H. SCHOR ETAL    3,108,295
FOLDING BOAT
Filed Oct. 6, 1958    5 Sheets-Sheet 5
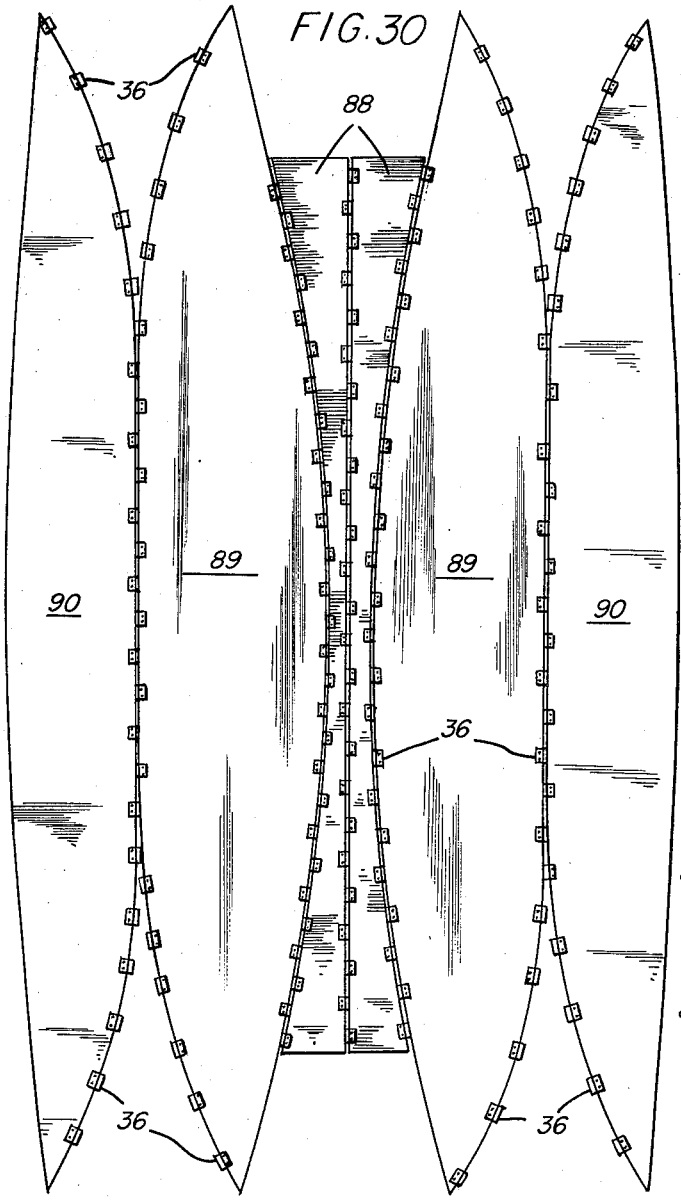
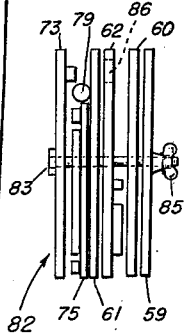
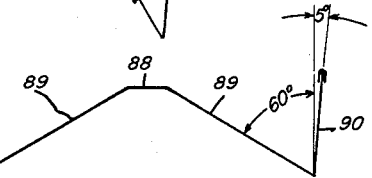
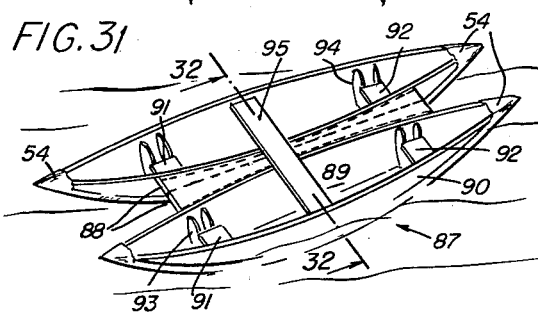
INVENTORS
HERBERT SCHOR
ROBERT N. SECK
BY United States Patent Office 3,108,295
Patented Oct. 29, 1963

3,108,295
FOLDING BOAT
Herbert Schor, 611 Oakcrest Drive, Brielle, N.J., and Robert N. Seck, R.D. 2, Box 180, Farmingdale, N.J.
Filed Oct. 6, 1958, Ser. No. 765,654
15 Claims. (Cl. 9—2)

This invention relates to a method and means of pivotally joining reversed curved boat panels. In particular, the invention relates to an elongated hinge forming adjustable seams in rigid collapsible boat construction, to which use, however, it is not restricted.

Although folding boats are old in the art, none has been previously produced to incorporate all of the features required by the nature and function of this particular type of craft.

Folding boats are particularly advantageous to fishing and hunting sportsmen in affording combined movability on water with compact handling and ease of transport on land. Collapsible boats for use with oars or outboard motor are also increasing in demand by a fast growing boating public for week-end and vacation excursions.

In the past, however, this type of marine craft has been relatively bulky, awkward to handle, complex to assemble and expensive to produce and maintain. Mostly made of canvas or with canvas hinges, such boats were difficult to waterproof, necessarily short-lived and generally impractical.

It is an object of our invention, therefore, to economically produce a practical, rigid folding boat strong enough to carry three or more adult persons, depending upon the size of the craft, and be propelled by an outboard motor.

A further object is to so simplify the construction of a folding boat that it may be easily and quickly assembled and dismantled, even by the uninitiated, thus removing the tediousness formerly associated with use of such craft.

A still further object is to construct a knockdown boat that will not only be initially watertight, but can be maintained in such condition by economically replacing the waterproofing means.

Yet another object is to so construct a rigid collapsible boat that all of the three dimensional stresses to which it will be subjected when in use will be evenly compensated throughout its structure, thereby prolonging the useful life of the craft, avoiding undue strain of any one part, and safe-guarding the lives or safety of its users.

We have now devised a means and method of economically mass producing rigid, compact, relatively light and completely operative folding boats. The boats comprising our invention are of a streamlined, watertight construction, affording ready assembly and disassembly in a minimum period of time.

One of the principal features of the invention is a continuous, curved, integral hinge adapted to be attached to flat curved edges of flexible materials when in closed or folded position which allows such material to adjust to a three plane curvature when opener or unfolded. This readily operative means of pivotally mounting the reversed curved surfaces of adjoining boat structure affords the use of basic, integral, precut panels and results in economies otherwise impossible to obtain.

Hinge clip components of various shapes and sizes, when integral with the flexible material, form one leaf of the hinge, the other leaf being additional, identical hinge clips integral with a second piece of flexible material. These two leaves in turn are secured together with a freely floating resilient pin or pintle. The hinge clips are alternately positioned on the flexible materials so that a spacing or clearance still exists between hinge clips of opposite leaves when the two leaves are secured with the pintle. The pin may be made captive by securing it at any one given point to one of the leaves.

The basic steps of fabricating the hull are reduced to precutting the main panels forming the integral unit, affixing the clips sections to pivotal edges of the panels, stacking two prepared floor panels between two prepared side panels, with curve mating curve, and inserting a common pintle in the form of a strong resilient rod through the sleeve portions of the clip sections of each juxtaposed panel to form three fore and aft evenly curved hinged seams. Flexible waterproofing material is then fastened across the stern and over the longitudinal hinges to maintain the boat when erected in water-tight condition.

Channels adapted to receive removable bulkheads and other hardware are fixed to the side and floor panels before the integral unit is hinged together. Secured with clasps to channels on all four panels of the hull, the bulkheads and transom not only provide the necessary transverse reinforcement to maintain the rigid boat in open and operative position, but are advantageously constructed to transfer downwardly directed loads imposed on the floor panels to the side panels of the boat. These inwardly directed forces from the side panels in opposition to the outwardly directed forces of the bulkheads and seats maintain the rigidity of the integral four piece hull.

The bulkheads perform further functions in providing seat supports and a transom as well as being the equalizing means through which three dimensional forces are evenly compensated and distributed throughout the structure.

Further features and advantages of the invention will be apparent in the following detail description and the accompanying drawings which illustrate preferred embodiments of the invention, wherein:

FIG. 1 is a knock-down, inside view of the four unhinged panels forming the floor and sides of a collapsible hull;

FIG. 2 is a top plan view of the four members shown in FIG. 1 hinged together to form the basic hull structure in partially unfolded position;

FIG. 3 is a side elevational view of the structure shown in FIG. 2 in compactly folded position;

FIG. 4 is an enlarged vertical end view taken on line 4—4 of FIG. 3 illustrating the method of rigidly joining two straight edges and a pair of two curved edges with freely floating pintles and showing the simplified manner in which the floor and side panels thereafter fold;

FIG. 5 is a fragmentary, perspective view of a self adjusting hinge comprising two flexible leaves united by an offset pintle, such as used for the hull shown in FIGS. 1-4;

FIG. 6 is a plan view of the waterproofing material ready for assembly;

FIG. 7 is a bottom perspective view of the hull partially unfolded, showing the manner in which the water-proofing means is affixed over the hinged seams;

FIG. 8 is a top perspective view of the boat with the floor boards unfolded in the first stage of erecting the hull;

FIG. 9 is a perspective view similar to that of FIG. 8 showing the first side panel pivotally raised on its self-adjusting hinge in the second stage of assembly;

FIG. 10 is a perspective view of the same boat shown in FIG. 8 with both side panels raised and maintained in such position by the forward bulkhead inserted in floor and side channels provided therefor;

FIG. 11 is a perspective view of a further stage of boat assembly showing all bulkheads inserted in floor and side channels before the waterproofing material is fastened about the rear bulkhead or transom. The bulkheads are shown secured in position by channel pin-engaging clasps and fasteners;

FIG. 12 is a fragmentary, perspective view of the stern showing in detail the means of securely waterproofing the transom;

FIG. 13 is a side elevation of a bulkhead with channel pin-receiving clasps and fasteners affixed thereto for releasable securement to floor and side channels;

FIG. 14 is an inside elevation of the transom with channel pin-receiving clasps, fasteners and seat retaining means attached thereto;

FIG. 15 is a top plan view of the rear seat adapted to be supported between the third bulkhead and transom;

FIG. 16 is a cross-sectional view of the rear seat taken on line 16—16 of FIG. 15, showing means for engaging its supporting bulkheads and bolt means used for storing the bulkheads and seats in a single packaged unit;

FIG. 17 is a side elevation of the second bulkhead with pin receiving clasps and fasteners attached;

FIG. 18 is an elevation of the first or forward bulkhead with channel retaining hardware secured thereto;

FIG. 19 is a top plan view of the forward seat adapted to fit over the first and second bulkheads shown in FIGS. 17 and 18;

FIG. 20 is a cross-sectional view of the rear seat taken on line 20—20 of FIG. 19 showing under structural means for secure engagement with its supporting bulkheads;

FIG. 21 is an enlarged sectional view of the stern taken on line 21—21 of FIG. 12 showing detailed rear structure of the boat after assembly.

FIG. 22 is an end view of a clip or individual double-leafed section of the self-adjusting hinge;

FIG. 23 is a side elevation of the clip shown in FIG. 22;

FIG. 24 is a fragmentary, perspective view of a retaining channel with locating pin and integral hooked edge which functions as a keeper for bulkhead fasteners;

FIG. 25 is a top plan view of the assembled boat schematically indicating the seating arrangement, the seats being partially broken away to illustrate how complementary channel formations conform to oppositely curved sides of the hull;

FIG. 26 is a fragmentary, top plan view showing a channel formation conforming to the curve of the port bow;

FIG. 27 is a similar top plan view showing a reversely curved channel conforming to the formation of the starboard bow;

FIG. 28 is a detailed sectional view taken on line 28—28 of FIG. 7 showing a means of securing weather stripping material to the hull of a folding boat;

FIG. 29 is an end elevation of packaged seats and bulkheads adapted to be separately transported as a self-contained suit case;

FIG. 30 is a pattern view of a modification of the invention showing the basic parts of a folding catamaran;

FIG. 31 is a perspective view of a collapsible catamaran assembled from the parts shown in FIG. 30 by means of self-adjusting hinges; and FIG. 32 is a cross-sectional diagram of an assembled catamaran taken on line 32—32 of FIG. 31.

Referring now to the drawings, a preferred embodiment of a folded boat indicated generally as 30 and illustrated in FIGS. 1–29, consists of four basic panels forming the hull, namely two floor panels when in open position, 31, 32, each having a straight edge and a reversely curved edge relative to that of the other floor panel, and two reversely curved side panels, a port side panel 33 and a starboard side panel 34, as shown in FIG. 1.

The panels are sawed or cut to shape from plywood or other suitable semi-flexible material, predrilled and painted or varnished. Plywood panels with a heavier center veneer and thin exterior veneers advantageously open easier and afford greater resistance to transverse bending stresses of the bottom. All hardware, such as channeling, posts, supports, etc., is affixed in proper position before the flat panels are hingeably joined together, as will be hereinafter described.

The separate hinge sections 35, stamped from stainless steel rolled edge stock are overlapped to form a right-angular clip 36 at the open end and a pin-receiving sleeve 37 at the bend. Sleeve 37 may be positioned in the same plane as the clip or it may be offset as shown, depending upon the intended use. The machine formed clips are then punched for holes 38 to facilitate riveting, stapling or being otherwise tightly secured to the panels as by screws 39. Obviously components 35 may be made by other methods, such as being cast or extruded.

Hinge sections 35 are clipped along the edges of the panels in alternate spaced relation, as clearly shown in FIG. 5. With the clips thus integrally secured, each panel becomes a flexible leaf of the self-adjusting hinge. After being fully processed, each pair of panels are pivotally joined by inserting a freely floating pin 40 within the aligned hinge sleeves 37. The pin or pintle thus freely floating within the clips of its two leaves affords self-adjustment of the hinged material when the material is pivoted from plane to plane or from closed to open position. The clips are arranged at the stern end to prevent the panels from shifting longitudinally off the pintle.

The hinge clips must be fabricated of strong bendable material capable of being bent or distorted when the leaves are stressed into unfolded position. When fixed along curved edges with sufficient clearance between complementary components, the clips are distorted with the pintle when the leaves are unfolded. The clips return to their original shape when the leaves are refolded. The over all longitudinal seams or hinge means, however, while sustaining the above described local distortions when moved between its two ultimate positions, remain curved and symmetric about a plane at all times.

The distortable hinge means, therefore, is foldable from one condition in which the curved edges lie in the same plane to an unfolded position in which two adjacent portions of its leaves are in contiguous relation along such curved edges. In other words, the hinge is adjustable from a folded position in which the parts are coplanar to a partially folded position in which the parts are not coplanar.

After the four main panels are hinged together, treated material 41 for waterproofing the hull 42 may be cut according to the pattern illustrated in FIG. 6 into longitudinal strips 44 and 45 which cover hinged side seams 47, 47. A wider portion 48, folded as shown in FIG. 12, maintains joined edges of the stern in watertight condition. By this construction the waterproofed cover is in normally flat position, affording ease of cleaning and avoiding retention of a three-corner fold during the major period of time when the boat is in storage. Any flexible waterproofing material may be used, such as canvas or duck dipped into neoprene.

The waterproofing material is advantageously secured by batten strips 49, 50 to the various portions of the hull as by screws 51 and posts 52, see FIG. 28. The posts are swedged and held on the hull panels before assembly. This efficient construction affords an easy means of re-waterproofing the boat in the event the original material becomes torn, by merely unscrewing the battens and replacing the worn canvas. If preferred, the weatherproofing material may be applied over the inner seams and transom.

A secondary material or chafing strip 53 may also be secured by the battens over the canvas to protect the primary material from excessive wear and thus extend its period of use. The chafing strip could also be attached over the batten strips with glove type fasteners (not shown). A satisfactory chafing strip may be made from a vinyl plastic or rubber impregnated cloth.

A boot 54 secured by the battens, waterproofs the bow and merely defines the forward limit of the boat.

Stainless steel, aluminum or other noncorrosive channeling 55, see FIG. 24, made from rolled edge strips is riveted or otherwise secured in registered alignment to all of the panels. The channels are preferably processed with an integral hooked edge 56 to which bulkheads may be clamped as by standard vibration-proof cam acting fasteners 57 at strategic locations indicated by pins 58.

Specific channel formations may be modified to conform to inwardly curving lines of the boat as graphically illustrated in FIGS. 25, 26 and 27.

Bulkheads 59, 60, 61 and 62 made of plywood or similar suitable material used for the panels and finished in like manner, are cut for insertion into the proper registering floor and side channels and firmly locked therein by means of fasteners 57 on the bulkheads. Clips 63 also prefixed to the bulkheads engage chanel pins 58, as clearly shown in FIG. 21.

The symmetrically made bulkheads are provided with side cutouts 64 to allow for hinged seams 47, 47, and all but the stern bulkhead or transom 62 are provided with a center cutout 65 to allow for the keel line seam 46. In addition, a stern stiffening member or doubler 66 is secured to the inner transom over which an outboard motor (not shown) may be mounted. Where the inner seams are waterproofed, portion 48 may be sandwiched between an extended doubler 66 and transom 62.

The channels are so made with integral pins 58 that loads imposed upon the floor are transmitted through the bottom channels, first to the bottom fasteners 57 and bottom pin receiving clips 63 through the bulkhead to side pins 58 and finally through the side channels to the sides of the boat. Downwardly directed loads imposed on a portion of the floor are thus evenly transmitted to maintain rigidity throughout the boat. The bulkheads may be notched as at 67, see FIG. 18, to fit between blocks 68, 68 on both ends of the side channels and over intermediate blocks 69 placed in each floor channel, in lieu of pins 58 and clips 63, to prevent sway. See FIG. 1.

A ledge 70, in cooperation with the doubler 66 forms a groove 71 into which the rear edge 72 of stern seat 73 may be inserted. The front portion of the rear seat is additionally supported by a pair of wooden blocks 74, 74 fastened to the side panels 33, 34 prior to assembly, as well as by bulkhead 61. Seats 73 and 75 are shaped to fit closely against the sides of the boat and are provided with longitudinal members 76 and transverse members 77 on the underside thereof.

The bulkheads are therefore stiffened by the resulting closely fitting grooves 78 in the under portion of the seats, see dotted line showing in FIGS. 15, 19 and 25. Due to the snug fit of connecting seat 73 against the aft side of bulkhead 61, motor pushing loads imposed on the transom are advantageously partially transmitted by the seat to its forward bulkhead. Two box griders are formed across the boat when the seats are in place, thereby strengthening the craft in torsion and sway.

Although the boat illustrated has only two seats, a bow stiffening rod 79 braced within side wall sockets 80 may be replaced by an additional seat supported by a third set of channels and fasteners, if desired. A gunnel strip 81 may be used to finish the boat, to which oarlocks (not shown) may be attached.

In operation, the steps of processing folded rigid boats according to the invention are:
 (1) Sawing stacked planks into shaped panels;
 (2) Drilling the panels;
 (3) Painting or varnishing the panels;
 (4) Applying hardware such as channels, hinge clips, blocks, etc. to the flat curved panels;
 (5) Sandwiching two floor panels between two side panels with curve mating curve;
 (6) Pushing elongated pins through registering hinge sleeves, while the flat panels are in stacked position; and
 (7) Attaching waterproofing canvas with batten strips.

The basic steps of assembling a folded boat are clearly illustrated in the drawings and comprise:
 (1) Unfolding middle panels shown in FIG. 3 with floor boards down as in FIG. 8;
 (2) Unfolding side panels as shown in FIG. 9 sufficiently to insert the first bulkhead in the forward bottom and side channels, see FIG. 10;
 (3) With both sides now in open position, inserting remaining bulkheads and transom and clasping in proper channels. Bow stiffening member is also positioned as shown in FIG. 11;
 (4) Folding waterproofing material over stern and fastening to transom as shown in FIG. 12; and
 (5) Inserting seats over bulkheads to complete rigid reinforcements to opened boat, as seen in FIG. 25.

To disassemble the boat, the above steps are reversed. When the last bulkhead is removed, side panels 33, 34 fold inwardly against the inside surfaces of floor panels 31, 32 respectively, and the two floor boards fold along hinge 46 with outer surfaces 31a, 32a meeting, curve mating curve. As previously stated, the hinged panels self-adjust along the freely floating pin when swung to open or closed position.

The embodiment illustrated in the drawings is about ten feet long with a fifty-two inch beam and eighteen inch freeboard. The hull weighs approximately seventy pounds, the removable structure about twenty-eight pounds, totaling ninety-eight pounds in all. Compactly folded, the hull can fit into a station wagon or be strapped to the top of any car. The bulkheads and seats may be packaged in a self-contained unit 82, see FIG. 29. Two bolts 83 permanently attached to rear seat 73 as shown in FIG. 16 receive the remaining seats and bulkheads through holes 84 drilled in these units. The packaged components are secured by wing nuts 85. A hand hole 86 in the transom serves as a handle for transporting the package in the manner of a suitcase. A maximum of three adult passengers and a 7½ H.P. outboard motor is recommended for this boat size.

It will be seen from the above that the invention advantageously reduces the compactly folding hull to its bare essentials and minimum size thereby facilitating ease of handling by removing the weight of all other supporting structure.

The same method of construction and same self-adjusting hinge used to construct the single folding hull of boat 30 is used in the construction of a double hulled folding catamaran 87, shown in FIGS. 30, 31 and 32. After cutting to shape, painting and preparing as above described, hinge sections 35 are affixed to all pivotal edges of the curved panels to form flexible leaves of the hinges. The two center panels 88, the two middle panels 89 and two outer panels 90 are stacked with curve mating curve and elongated pins 40 are pushed through registering sleeves 37 to join the six superimposed panels into an integral six piece hull.

Thus pivotally joined, the four inner panels of the collapsed catamaran extend in a single plane with the two outer panels 90 folding over middle panels 89. To assemble for use, panels 90 are simultaneously unfolded outwardly to an approximate 5° slant to the vertical which extend panels 89 to an approximate 60° to the vertical to form the double hulls, as shown in FIGS. 31 and 32. The outwardly directed stresses exerted by unfolding panels 90 and 89 force flexible center panels 88, 88 into a crowned position. This crowning action also occurs when panels 89 and 90 are collapsed from a compoundly curved hull into a single plane. Such action results in a fore and aft crowned curve of panels 88, 88. The catamaran is maintained in erect position by inserting transverse seats 91, 92 over locked bulkheads 93, 94 and by center stiffening board 95.

Catamarans, planing at low speeds and particularly desirable for sailing, are also easily transported on the top of a car.

The forms of the invention here described and illustrated are presented merely as examples of how the invention may be embodied and applied. Other forms, embodiments and applications of the invention, coming within the proper scope of the appended claims, will, of course, suggest themselves to those skilled in the art.

We claim:

1. A collapsible article comprising a pair of semi-flexible panels, each of said panels having identically curved edges when in superimposed collapsed position and reversed curved edges when in flat contiguous position, a distortable hinge means for joining said panels along said curved edges, said hinge means comprising a plurality of sleeve clips, said clips being disposed in spaced registering relationship along both of said curved edges to form two curved leaves of said hinge means, and an elongated semi-resilient pintle freely floating within said sleeve clips, each of said leaves being freely adjustable relative to the other along said common pintle to flex into a bowed formation when said article is erected from such collapsed position, said pintle being of greater length than said leaves to allow full engagement within said clips during adjustment of said article from collapsed to open position.

2. A collapsible boat comprising a semi-flexible floor panel, two semi-flexible side panels having a curved edge, distortable hinge means joining the curved edges of said side panels and said floor panel to form a collapsible hull, said hinge means comprising integral hinge clips on said panels disposed parallel to said curved edges, each of the clips along one edge being spaced apart from complementary clips along a joining edge, and a semi-resilient pintle freely floating within said clips along each pair of said joining edges, said hinge means being adjustable from a folded position in which said panels are coplanar to a partially folded position in which said panels are not coplanar.

3. A collapsible boat according to claim 2 including a plurality of transversely disposed bulkheads, and cooperating means to rigidly lock said bulkheads to said floor and side panels and maintain said hull in open position.

4. A collapsible boat according to claim 2 wherein the sharper the curved edges of said panels when in folded coplanar position the further said clips are spaced thereon, and the sharper the curve of said pintle and of said panels when said hull is bowed into a multicurved open position.

5. A collapsible boat according to claim 2 wherein said floor panel comprises two parts, each of said parts having an inner straight edge, said straight edges being joined by distortable hinge means constructed like said first mentioned hinge means.

6. A collapsible boat according to claim 2 wherein said clips are distortable with said pintle when said hull is unfolded into operative position.

7. A collapsible boat according to claim 2 wherein said pintles are offset from said panels, said pintle when said panels are unfolded bowing in a sharpening curve in direct proportion to the offset of the plane containing said pintle when said panels are folded.

8. A collapsible boat comprising a semi-flexible center panel, two semi-flexible middle panels and two semi-flexible outer panels, each of said panels having at least one curved edge, distortable hinge means joining the curved edges of said outer panels to a curved edge of said middle panels and the other curved edge of said middle panels to the curved edges of said center panel to form a collapsible double hulled boat, said hinge means comprising integral hinge clips on said panels disposed parallel to said curved edges, each of the clips along one edge being spaced apart from complementary clips along a joining edge, and a semi-resilient pintle freely floating within said clips along each pair of said joining edges, said hinge means being adjustable from a folded position in which said panels are coplanar to a partially folded position in which said panels are not coplanar.

9. A collapsible boat according to claim 8 wherein said center panel comprises two parts, each of said parts having an inner straight edge, said straight edges being joined by distortable hinge means constructed like said first mentioned hinge means.

10. A collapsible boat according to claim 9 wherein said center panels are stressed into a fore and aft crowned curve when said outer panels are simultaneously unfolded from such folded position.

11. A collapsible boat according to claim 8 wherein said distortable hinge means imparts extreme rigidity to said panels when unfolded and wherein said panels hold a relative relationship of such joined edges constant throughout the length thereof when said boat is assembled.

12. A collapsible boat according to claim 3, wherein the stern bulkhead forms a removable transom.

13. A collapsible boat according to claim 2 wherein said panels are mutually adjustable on said floating pintle when said hull is converted from such coplanar folded position to a compound three plane open position.

14. A collapsible boat according to claim 8 wherein said middle panels are stressed into about a 60° angle formation from the vertical when said outer panels are pulled open to about a 5° angle to the vertical to form rigid hulls.

15. A collapsible boat according to claim 13 in which said pintles extend through said clips beyond the longitudinal edges of said panels when said panels are in folded position to afford complete engagement therewith when said panels are in unfolded position.

References Cited in the file of this patent

UNITED STATES PATENTS

| | | |
|---|---|---|
| 473,012 | Moore | Apr. 19, 1892 |
| 481,207 | Smith | Aug. 23, 1892 |
| 487,939 | Smith | Dec. 13, 1892 |
| 1,062,181 | Nyboe | May 20, 1913 |
| 1,739,269 | Straussler | Dec. 10, 1929 |
| 1,793,617 | Hudson | Feb. 24, 1931 |
| 1,828,805 | Hudson | Oct. 27, 1931 |
| 1,868,280 | Elling | July 19, 1932 |
| 1,895,380 | Elling | Jan. 24, 1933 |
| 1,988,085 | Orlando | Jan. 15, 1935 |
| 2,201,968 | Fischer | May 21, 1940 |
| 2,271,338 | Hamlin | Jan. 27, 1942 |
| 2,432,396 | Earhart | Dec. 9, 1947 |
| 2,504,225 | Randrup | Apr. 18, 1950 |
| 2,522,910 | Wayne | Sept. 19, 1950 |
| 2,830,308 | Green | Apr. 15, 1958 |
| 2,917,754 | Gunderson | Dec. 22, 1959 |
| 2,918,031 | Gunderson | Dec. 22, 1959 |
| 2,977,606 | Straussler | Apr. 4, 1961 |